United States Patent
Torre et al.

[19]

[11] Patent Number: 5,883,510
[45] Date of Patent: Mar. 16, 1999

[54] TACHOMETER SYSTEM PICKING UP IGNITION SIGNALS FROM VEHICLE GROUND

[75] Inventors: Joseph J. Torre; Steven J. Nichols, both of Kalamazoo, Mich.

[73] Assignee: SPX Corporation, Muskegon, Mich.

[21] Appl. No.: 854,975

[22] Filed: May 13, 1997

[51] Int. Cl.[6] ............................... G01P 3/42; F02P 17/00
[52] U.S. Cl. .......................... 324/160; 324/170; 324/392
[58] Field of Search ................................... 324/169, 170, 324/177, 160, 166, 391, 402, 133, 392, 178; 340/142, 145, 148, 151; 73/116

[56] References Cited

U.S. PATENT DOCUMENTS

| | | | |
|---|---|---|---|
| D. 366,003 | 1/1996 | Take et al. ................................. | D10/98 |
| 3,793,583 | 2/1974 | Glomski et al. .......................... | 324/379 |
| 3,811,089 | 5/1974 | Strzelewicz .............................. | 324/402 |
| 3,886,450 | 5/1975 | Trussell et al. ........................... | 324/402 |
| 3,942,113 | 3/1976 | Wilson ..................................... | 324/402 |
| 4,059,799 | 11/1977 | Faria ....................................... | 324/169 |
| 4,274,142 | 6/1981 | Furuhashi et al. ....................... | 324/166 |
| 4,296,471 | 10/1981 | Goux ....................................... | 324/391 |
| 4,536,708 | 8/1985 | Schneider ................................ | 324/174 |
| 4,578,755 | 3/1986 | Quinn et al. ............................. | 324/391 |
| 4,608,954 | 9/1986 | Gray ........................................ | 324/402 |
| 4,732,034 | 3/1988 | Bjorn ........................................ | 73/116 |
| 4,777,435 | 10/1988 | Lepley et al. ........................... | 324/166 |
| 4,942,362 | 7/1990 | Lance ...................................... | 324/402 |
| 5,043,659 | 8/1991 | Lowmiller et al. ...................... | 324/160 |
| 5,151,654 | 9/1992 | Krzywicki et al. ...................... | 324/160 |
| 5,269,187 | 12/1993 | Hanson .................................... | 73/495 |
| 5,399,972 | 3/1995 | Hnat et al. ............................... | 324/399 |
| 5,614,828 | 3/1997 | Sims ....................................... | 324/402 |

*Primary Examiner*—Jay M. Patidar
*Attorney, Agent, or Firm*—Kinney & Lange, P.A.

[57] ABSTRACT

A ground pick-up tachometer for detecting a rotational speed of an engine in a vehicle includes a probe arranged for connection to a vehicular ground to detect signals emitted from an ignition system of the engine. A tachometer circuit is operatively connected to the probe to identify the detected signals representing ignition sparks and provide an output representative of the rotational speed of the engine based on the identified signals. The tachometer circuit includes a circuit common reference, separate from the vehicular ground.

14 Claims, 3 Drawing Sheets

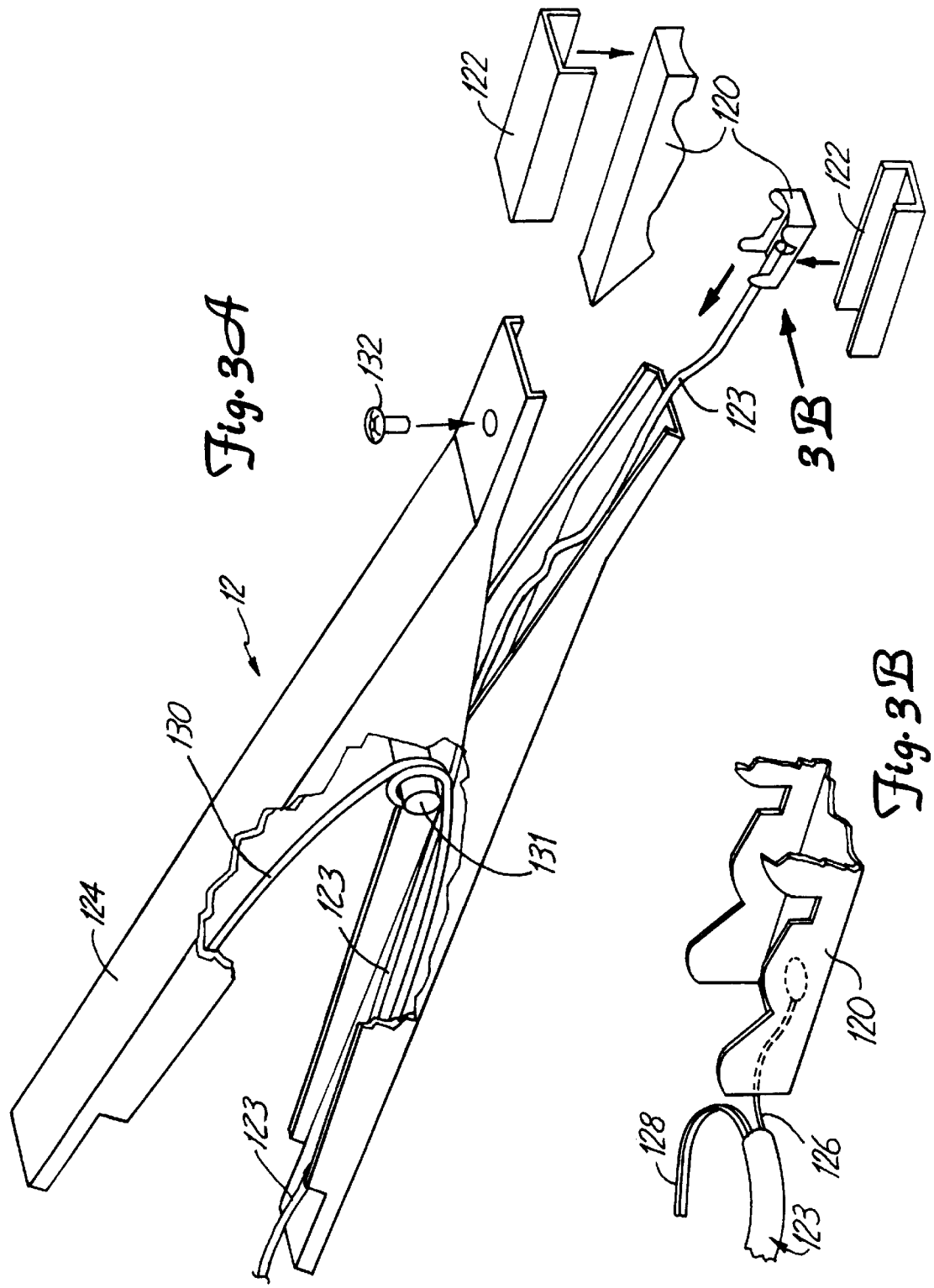

TACHOMETER SYSTEM PICKING UP IGNITION SIGNALS FROM VEHICLE GROUND

BACKGROUND OF THE INVENTION

The present invention relates to a tachometer system, and more particularly relates to a system for detecting the rotational speed of an internal combustion engine from a connection to a grounded portion of a vehicle containing the engine.

Tachometer systems for measuring the rotational speed of an engine conventionally attach to a spark plug wire of the engine. The ignition signal present on the spark plug wire is inductively or capacitively coupled to a direct pick-up tachometer, and the rotational speed of the engine, typically in revolutions per minute (rpm), is derived from the frequency of ignition spark pulses in the ignition signal. However, many engines have inaccessible spark plug wires or no spark plug wires at all, making direct pick-up tachometers difficult or impossible to use.

Radio frequency (RF) antenna tachometers have been developed to address some of the problems associated with direct pick-up tachometers. RF tachometers detect radiated signals from the ignition system of the engine to obtain the ignition spark pulses and derive the rotational speed of the engine therefrom. In many engines, RF emissions from the ignition system are faint, low-power signals, forcing the RF antenna of the tachometer to be highly sensitive in order to detect ignition signals. Differences between ignition systems for different types of engines and the associated levels of radiated ignition signals make it quite difficult to filter out RF emissions from adjacent vehicles while operating an RF antenna tachometer. This is especially true in the service and repair station context, where adjacent cars under service are relatively close by. Moreover, an open spark plug wire, such as a cracked conductor, may cause high voltage arcs that can overpower a nearby RF antenna tachometer system.

Therefore, there is a need for a tachometer system that reliably measures the rotational speed of an engine while overcoming the problems of direct pick-up and RF antenna tachometers.

SUMMARY OF THE INVENTION

The present invention is a system for detecting a rotational speed of an engine in a vehicle. A probe is arranged for connection to a vehicular ground to detect signals emitted from an ignition system of the engine. A tachometer circuit is operatively connected to the probe to identify the detected signals representing ignition sparks and provide an output representative of the rotational speed of the engine based on the identified signals. The tachometer circuit includes a circuit common reference.

In one aspect of the invention, the tachometer circuit includes a noise threshold comparator circuit, a flip-flop circuit, a microcontroller circuit, and a noise threshold converter circuit. The noise threshold comparator circuit distinguishes the ignition sparks of the engine from transient noise signals. The microcontroller circuit controls a flip-flop circuit to selectively provide an interrupt signal. The microcontroller circuit provides a noise threshold command signal based on the ignition sparks, and provides an output signal representing the rotational speed of the engine. The noise threshold converter circuit converts the noise threshold command signal into an analog noise threshold signal and provides the analog noise threshold signal to the noise threshold comparator circuit.

In a further aspect of the invention, the probe includes a pair of opposing spring-biased jaws arranged to clamp to a portion of the vehicle to connect to the vehicular ground. In one form, the probe includes a conductive handle, insulating material for electrically isolating the handle, and a cable providing a first connection to supply vehicular ground to the tachometer circuit and a second connection between circuit common and the handle.

A still further aspect of the invention is a method of detecting a rotational speed of an engine in a vehicle. A probe is connected to a vehicular ground to detect signals emitted from an ignition system of the engine. A circuit common reference is provided. The detected signals representing ignition sparks of the engine are identified, and an output is provided representative of the rotational speed of the engine, based on the identified signals.

BRIEF DESCRIPTION OF THE DRAWINGS

FIGS. 3A and 3B are exploded perspective views of the ground pick-up probe for use in the ground pick-up tachometer of FIG. 1.

DETAILED DESCRIPTION OF THE PREFERRED EMBODIMENTS

Figure 1:
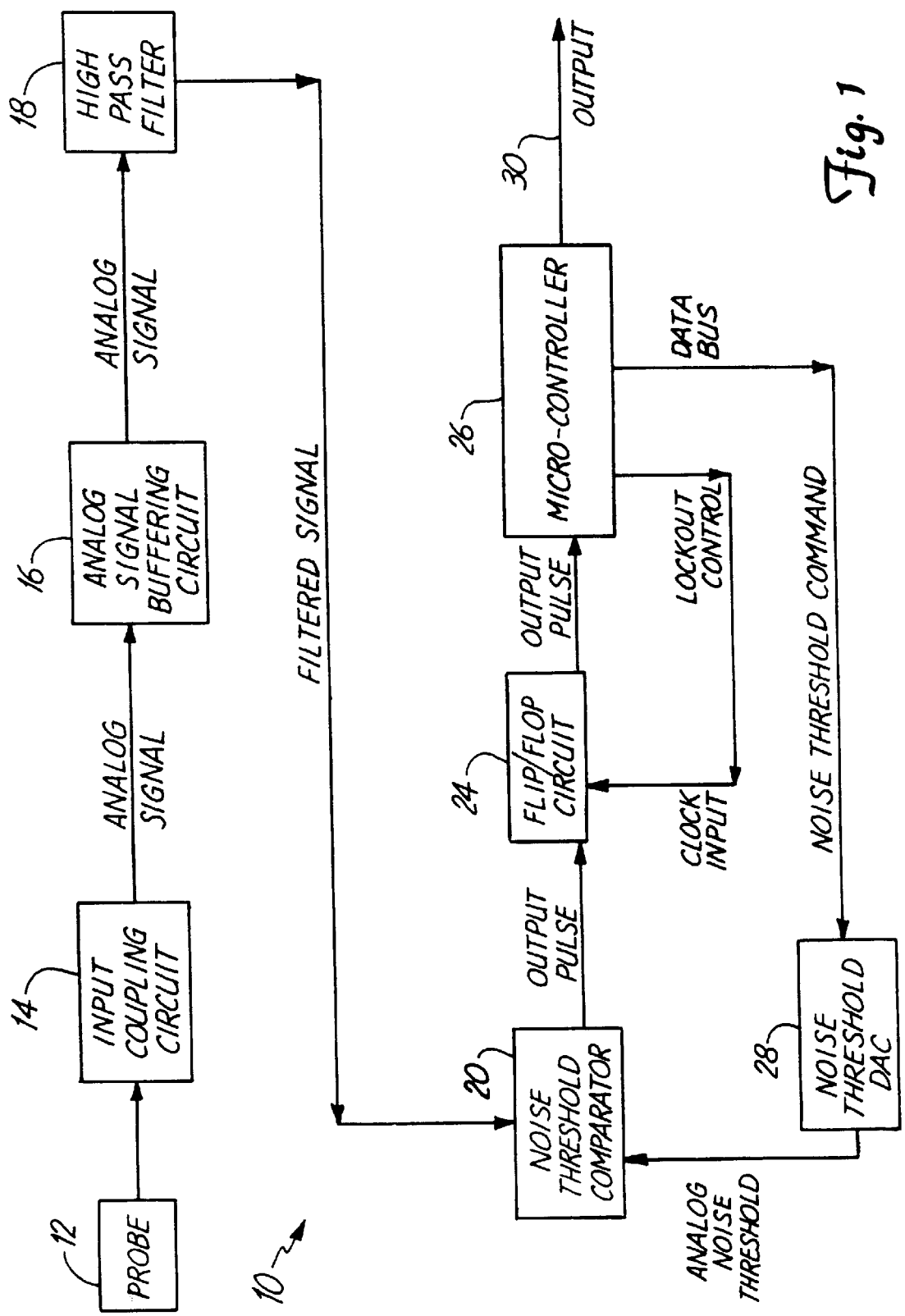
FIG. 1 is a block diagram of a ground pick-up tachometer of the present invention.

FIG. 1 is a block diagram of a ground pick-up tachometer 10 according to the present invention. Ground pick-up tachometer 10 includes probe 12, input coupling circuit 14, analog signal buffering circuit 16, high pass 44 filter 18, noise threshold comparator 20, flip-flop circuit 24, microcontroller 26, and noise threshold digital-to-analog converter (DAC) 28. Ground pick-up tachometer 10 may be implemented as a component of a larger system for analyzing the operation of a vehicle engine, such as an emission tester, an ignition tester, or a complete engine analyzer. The system may be operated from a self-contained portable power supply or may receive power from a permanent wall socket, for example.

Probe 12 attaches to a grounded portion of a vehicle under test. Ignition sparks radiate from the engine in the vehicle to induce pulse signals into the ground system of the vehicle. Probe 12 is connected to a grounded portion of the vehicle to pick up the induced ignition signal. The ignition signals picked up by probe 12 are provided to input coupling circuit 14, which removes any DC component in the ignition signals and outputs an analog signal representative of the ignition spark. The analog signal is buffered by analog signal buffering circuit 16. High pass filter 18 filters low frequency components out of the analog signal. The bandwidth limit of buffering circuit 16 along with high pass filter 18 effectively act as a bandpass filter for the analog signal. The filtered signal is then provided to noise threshold comparator 20.

Noise threshold comparator 20, flip-flop 24, microcontroller 26, and noise threshold digital-to-analog converter (DAC) 28 are configured in a feedback loop. Noise threshold comparator 20 initially outputs a signal based on the filtered signal received from high pass filter 18. Flip-flop 24 operates on the signal from noise threshold comparator 20, in response to signals received from microcontroller 26, to lock out multi-strike signals. In multi-strike vehicles, where several ignition pulses occur for each revolution, ignition pulses received shortly after an initial ignition pulse must be locked out, so that the tachometer's engine speed reading is not distorted. Microcontroller 26 generates a lockout control clock signal and provides it to flip-flop 24 to prevent flip-flop 24 from operating on ignition pulses immediately after an initial ignition pulse. Hence, the tachometer functions properly when testing multi-strike ignition engines. Microcontroller 26 also provides a digital noise threshold command signal, based on the output of flip-flop 24, to noise threshold DAC 28. DAC 28 converts the digital noise threshold command signal to an analog noise threshold signal, which is then input to noise threshold comparator 20. The circuit functions adaptively, determining the noise threshold of the filtered ignition signal as a function of the filtered ignition signal itself, to determine whether an actual ignition pulse is received. Microcontroller 26 identifies the actual ignition pulses and outputs a pulsed output signal on line 30 corresponding to cylinder firings per minute, which is representative of the speed of the engine in revolutions per minute (rpm), and the pulsed output is supplied to the circuitry associated with the unit of which ground pick-up tachometer 10 is a part. Alternatively, when ground pick-up tachometer 10 is implemented as a stand-alone unit, microcontroller 26 may be programmed to calculate the rotational speed of the engine based on the identified ignition signals and provide a digital signal representative of the speed of the engine to a display (not shown) to visually display the rotational speed of the engine in rpm.

Figure 2:
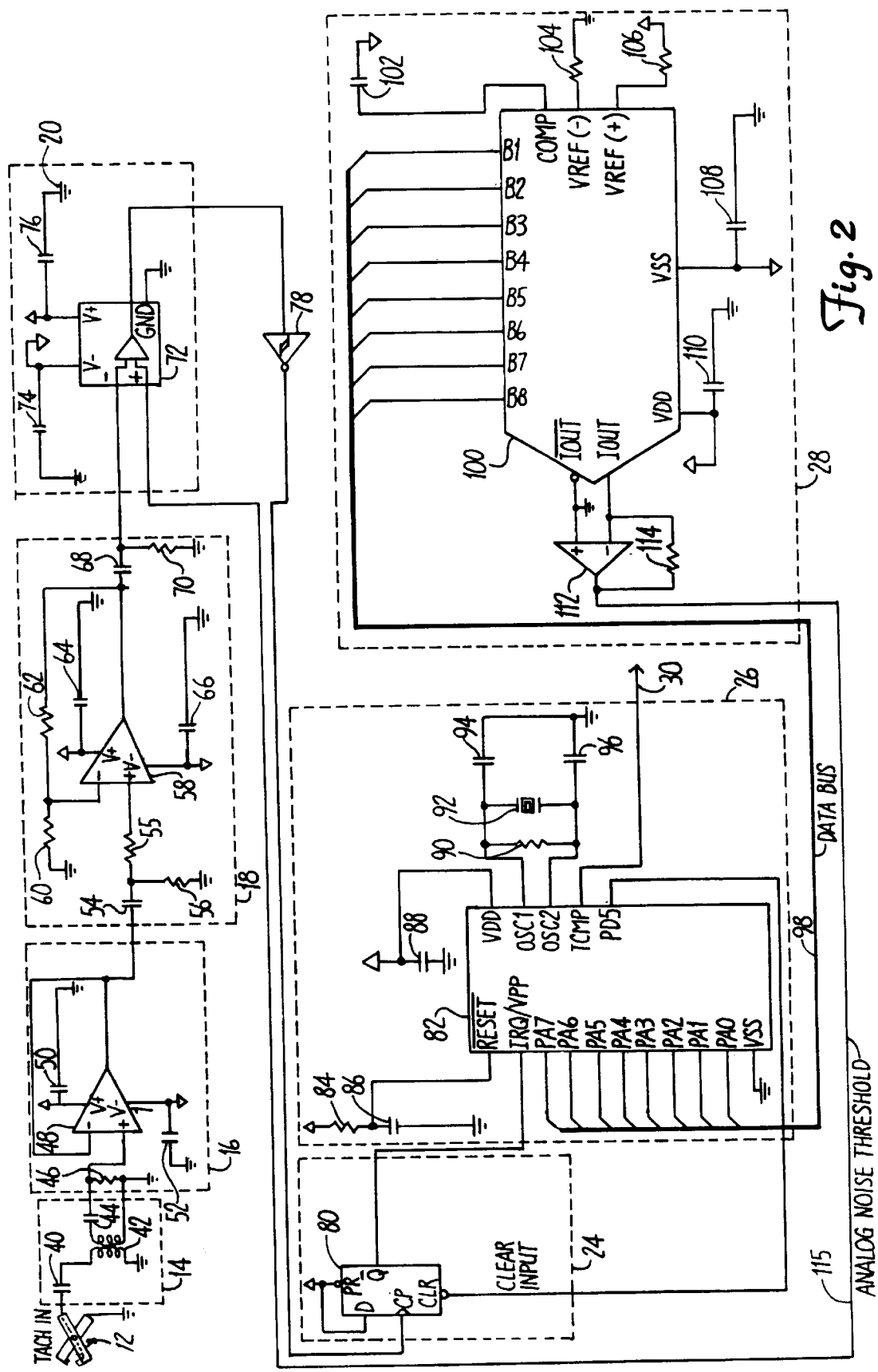
FIG. 2 is a circuit diagram of the ground pick-up tachometer of FIG. 1.

FIG. 2 is a schematic diagram illustrating the circuit elements of the ground pick-up tachometer. Probe 12 is attached to a grounded portion of the vehicle under test to obtain a TACH IN signal, and includes a reference connection to "circuit common." Circuit common is a common reference voltage, which may be an external ground, separate from the ground system of the vehicle, or a floating reference voltage provided by a portable power supply, as is known in the art. Thus, as used herein, "circuit common" refers to the reference potential supplied by the circuit or an external ground such as building ground supply provided by pipes and the like associated with electric power supplied to the building by a power company. Throughout FIG. 2, circuit common is denoted by the traditional ground symbol. "Vehicle ground," on the other hand, refers to a grounded portion of the vehicle on which ignition sparks radiate, such as the engine block, exhaust system, or chassis. Thus, the ground connection shown schematically in FIG. 2 actually depicts a connection to the circuit common reference provided in the tachometer circuit, and the TACH IN signal depicts a connection to a grounded portion of the vehicle under test.

The TACH IN signal is applied to input coupling circuit 14, which includes capacitor 40, impedance matched coupling transformer 42, and capacitor 44. Specifically, the TACH IN signal is applied to capacitor 40, which is connected to one end of the primary winding of coupling transformer 42, the other end of the primary winding being connected to circuit common. One end of the secondary winding of transformer 42 is connected through capacitor 44 to a positive input of analog signal buffering circuit 16, while the other end of the secondary winding is connected to a circuit common input of analog signal buffering circuit 16.

Analog signal buffering circuit 16 includes resistor 46, operational amplifier 48, and capacitors 50 and 52. Resistor 46 is connected between the positive and circuit common inputs of analog signal buffering circuit 16. The positive input is connected to the non-inverting input of operational amplifier 48. The negative supply terminal of operational amplifier 48 is connected to a −12 V source, with capacitor 52 coupled in parallel to circuit common. The positive supply terminal of operational amplifier 48 is connected to a +12 V source, with capacitor 50 coupled in parallel to circuit common. The output of operational amplifier 48 is connected to the inverting input of amplifier 48, and to the input of high pass filter 18.

High pass filter 18 includes capacitor 54, resistors 55 and 56, operational amplifier 58, resistors 60 and 62, capacitors 64, 66 and 68, and resistor 70. Capacitor 54 and resistor 55 are connected in series between the input of high pass filter 18 and the non-inverting input of operational amplifier 58. Resistor 56 is connected between circuit common and a node between capacitor 54 and resistor 55. The inverting input of operational amplifier 58 is connected through resistor 60 to circuit common, and also through resistor 62 to the output of operational amplifier 58. The negative supply terminal of operational amplifier 58 connected to a −12 V source, with capacitor 66 coupled in parallel to circuit common. The positive supply terminal of operational amplifier 58 is connected to a +12 V source, with capacitor 64 coupled in parallel to circuit common. The output of operational amplifier 58 is connected through capacitor 68 to an output of high pass filter 18. Resistor 70 is connected between the filter output and circuit common. The filter output is in turn connected to the input of noise threshold comparator 20.

Noise threshold comparator 20 includes comparator 72 and capacitors 74 and 76. The input signal of noise threshold comparator 20 received from the output of high pass filter 18 is applied to the negative input of comparator 72. The negative supply terminal of comparator 72 is connected to a −12 V source, with capacitor 74 coupled in parallel to circuit common. The positive supply terminal of comparator 72 is connected to a +12 V source, with capacitor 76 coupled in parallel to circuit common. The positive input of comparator 72 receives an analog noise threshold signal from noise threshold DAC 28. The output signal from comparator 72 is applied from noise threshold comparator 20 through Schmitt-triggered inverter 78 to the input of flip-flop circuit 24.

Flip-flop circuit 24 is a "D" flip-flop device 80. The inverted signal received from the output of noise threshold comparator 20 is applied to the clock pulse (CP) input of flip-flop 80. The "D" input of flip-flop 80 is connected to a +5 V source. The pre-set (PR) input of flip-flop 80 is also connected to the +5 V source. The clear (CLR) input of flip-flop 80 receives a "clear" input signal from microcontroller 26. The $\overline{Q}$ output of flip-flop 80 is connected to the input of microcontroller 26.

Microcontroller 26 includes microprocessor 82, resistor 84, capacitors 86 and 88, resistor 90, crystal oscillator 92, and capacitors 94 and 96. Microprocessor 82 may preferably be a 68HC705P9 device commercially available from Motorola Corporation. The input to microcontroller 26 is received at the interrupt request (IRQ) pin of microprocessor 82. The $\overline{\text{RESET}}$ pin of microprocessor 82 is connected through resistor 84 to a +5 V source, and is also connected through capacitor 86 to circuit common. The VDD pin of microprocessor 82 is connected to the +5 V source, with capacitor 88 coupled in parallel to circuit common. The OSC1 pin of microprocessor 82 is connected through capacitor 94 to circuit common, and the OSC2 pin of microprocessor 82 is connected through capacitor 96 to circuit common. Resistor 90 and crystal oscillator 92 are each connected between the OSC1 pin and the OSC2 pin of microprocessor 82. The PD5 pin of microprocessor 82 provides the "clear" input signal to the CLR input of flip-flop 80. The VSS pin of microprocessor 82 is connected to circuit common.

The PA0–PA7 parallel output pins of microprocessor 82 are coupled to data bus 98, to provide a digital input signal to noise threshold DAC 28. The digital signal on data bus 98 is input to noise threshold DAC 28, which includes converter 100, capacitor 102, resistors 104 and 106, capacitors 108 and 110, operational amplifier 112, and resistor 114. Converter 100 is preferably an off-the-shelf digital-to-analog converter device that converts the parallel digital input signal on bus 98 to an analog signal. The negative reference voltage terminal of converter 100 is connected through resistor 104 to circuit common. The positive reference voltage terminal of converter 100 is connected through resistor 106 to a +5 V source. The compensation (COMP) terminal of converter 100 is connected through capacitor 102 to a −12 V source. The VSS terminal of converter 100 is connected to the −12 V source, with capacitor 108 coupled in parallel to circuit common. The VDD terminal of converter 100 is connected to the +5 V source, with capacitor 110 coupled in parallel to circuit common. The $\overline{\text{IOUT}}$ and IOUT output signals of converter 100 are connected to the noninverting and inverting inputs, respectively, of operational amplifier 112. The non-inverting input of operational amplifier 112 is also connected to circuit common. The inverting input of operational amplifier 112 is also connected through resistor 114 to the output of operational amplifier 112. The output of operational amplifier 112 is the analog noise threshold signal 115 that is input to the non-inverting input of comparator 72 in noise threshold comparator 20.

The signal at the timer compare (TCMP) pin of microprocessor 82 is output from microcontroller 26 as a pulsed output on line 30 corresponding to cylinder firings per minute, which is representative of the speed of the engine in the vehicle under test in revolutions per minute, based on the ignition signals received from probe 12. Alternatively, when the ground pick-up tachometer is implemented as a stand-alone unit, microprocessor 82 receives additional input information (such as number of cylinders, etc.) and is programmed to calculate the rotational speed of the engine based on the ignition signals received and output a digital signal representative of the speed of the engine in rpm.

In operation, the TACH IN signal obtained by probe 12 passes through DC blocking capacitor 40, which removes the DC elements from the signal, to impedance matched transformer 42 in input coupling circuit 14, which outputs a signal representative of the ignition signal of the engine under test. The signal output from input coupling circuit 14 is buffered by operational amplifier 48 configured as a buffer in analog signal buffering circuit 16, and the buffered signal is then provided to high pass filter 18. Operational amplifier 58 is configured as a high pass filter to filter the low frequency components of the buffered input signal provided from analog signal buffering circuit 16. High pass filter 18 provides the filtered signal to comparator 72 of noise threshold comparator circuit 20. Comparator 72 also receives an analog noise threshold input on line 115 from noise threshold DAC 28. Comparator 72 compares the input signal representative of the ignition signal of the engine to the analog noise threshold signal on line 115, to distinguish actual ignition pulses from transient noise signals.

The output of noise threshold comparator circuit 20 is inverted by inverter 78 and provided to the CP input of flip-flop 80, which is configured to provide an interrupt signal to microprocessor 82 upon receiving a pulse at the CP input in the absence of a "clear" input at its CLR input. Upon receiving an initial interrupt signal from flip-flop 80, microprocessor 82 provides the "clear" or lockout input to flip-flop 80 for a predetermined amount of time, to block subsequent ignition pulses occurring immediately after an initial ignition pulse, which occur in multistrike vehicles and would otherwise distort tachometer readings. The predetermined amount of time that the clear signal is provided may be established by the microprocessor based on an estimated speed of the engine, for example, to lock out successive multistrike ignition signals for an appropriate portion of the ignition cycle of the engine. Thus, microprocessor 82 can count the number of ignition pulses received as interrupts from flip-flop 80 for a given time period encompassing several engine cycles, and output a pulse representative of the rotational speed of the engine based on the ignition pulses.

Microprocessor 82 also outputs an 8-bit signal on data bus 98 based on the consistency of the input signal received from flip-flop 80 representative of the ignition signal of the engine under test. This 8-bit signal is input to DAC converter 100, which converts the signal to an analog signal which is amplified by operational amplifier 112 to derive the analog noise threshold signal on line 115, providing a noise threshold for the ignition input signal to noise threshold comparator 20 based on characteristics of the ignition input signal itself.

FIGS. 3A and 3B illustrate an exemplary embodiment of probe 12, which includes metal contacts 120, insulating material 122, coaxial cable 123 having inner conductor 126 and outer conductor 128, handle 124, spring member 130, pin 131, and screw 132. Probe 12 is preferably a spring clamp, similar to a clamp on a battery jumper cable, with metal contacts 120 forming opposing jaws of the probe, insulating material 122, and handle 124. Coaxial cable 123 is coupled to probe 12 to carry electrical signals to the tachometer circuitry of FIGS. 1 and 2. Insulating material 122 electrically isolates metal contacts 120 from handle 124 of the probe. Metal contacts 120 of probe 12 are electrically connected to center conductor 126 of thin coaxial cable 123 to supply induced ignition pulse signals to the tachometer circuit. Handle 124 is electrically connected to outer conductor 128 of coaxial cable 123, to electrically ground handle 124 to circuit common. This arrangement of handle 124 is preferred to prevent 60 Hertz noise from the hand of a user from interfering in the operation of the tachometer.

Probe 12 preferably includes spring member 130 wound around pin 131 of handle 124. When a user presses the opposing arms of handle 124 together, metal contacts 120 separate to form the opposing jaws of probe 12. When a user releases the arms of handle 124, spring 130 forces the arms apart to clamp metal contacts 120 together around an object positioned between the open jaws of probe 12, which is a grounded portion of the vehicle under test. Screw 132, which mechanically fastens metal contacts 120 and insulating elements 122 to the body of handle 124, may be equipped with an insulating washer or composed of an insulating material, for example, so that metal contacts 120 are electrically isolated from the body of handle 124.

In operation, probe 12 clamps onto a grounded portion of the vehicle under test, such as the engine block, exhaust system, or chassis, with metal contacts 120 directly contacting the grounded portion of the vehicle. Center conductor 126 of coaxial cable 123 carries the ignition signal radiated onto the ground system of the vehicle and picked up by metal contacts 120 to the remainder of the ground pick-up tachometer circuit. Outer conductor 128 of coaxial cable 123 is connected to an external circuit common reference. Thus, although the ignition signal picked up by probe 12 is faint, the effects of external RF noise are minimized, by referencing the ignition signal to external circuit common.

The ground pick-up tachometer system of the present invention couples to a grounded portion of a vehicle under test to analyze ignition signals of an engine and thereby measure the rotational speed of the engine. The ground pick-up tachometer may be used for engines having inaccessible spark plug wires or no spark plug wires at all, and is not adversely affected by RF emissions from adjacent vehicles. Multi-strike ignition engines are also accommodated. The ground pick-up tachometer of the present invention is therefore a versatile, reliable tool for measuring the rotational speed of an engine.

Although the present invention has been described with reference to preferred embodiments, workers skilled in the art will recognize that changes may be made in form and detail without departing from the spirit and scope of the invention.

What is claimed is:

1. A system for detecting a rotational speed of an engine in a vehicle, the system comprising:

a probe for connection to a vehicular ground to detect signals emitted from an ignition system of the engine; and a tachometer circuit operatively connected to the probe for identifying the detected signals representing ignition sparks of the engine and for providing an output representative of the rotational speed of the engine based on the identified signals, the tachometer circuit having a circuit common reference.

2. The system of claim 1, wherein the probe includes a pair of opposing spring-biased jaws, at least one of the jaws having a metal contact, the jaws being arranged to clamp to a portion of the vehicle so that at least the metal contact is connected to the vehicular ground.

3. The system of claim 2, wherein the probe has a conductive handle, insulating material for electrically isolating the metal contact from the handle, and a cable providing a first connection between the metal contact and the tachometer circuit to supply vehicular ground to the tachometer circuit and a second connection between the circuit common reference and the handle.

4. The system of claim 1, wherein the tachometer circuit comprises:

a noise threshold comparator circuit for comparing signals detected by the probe to a noise threshold signal;

a flip-flop circuit responsive to the noise threshold comparator circuit for providing interrupt signals representative of the ignition sparks of the engine;

a microcontroller circuit operatively connected to the flip-flop circuit and responsive to the interrupt signals for providing a noise threshold command signal based on the ignition sparks of the engine and for providing an output signal representing the rotational speed of the engine; and a noise threshold converter circuit responsive to the noise threshold command signal to provide the noise threshold signal.

5. The system of claim 4, wherein the noise threshold converter circuit provides the noise threshold signal based on the noise threshold command signal, and the noise threshold comparator circuit operates the flip-flop circuit to provide the interrupt signals when the noise threshold comparator circuit identifies that the signals detected by the probe exceed the noise threshold signal.

6. The system of claim 4, wherein the microcontroller circuit provides a lockout signal of predetermined duration in response to an interrupt signal, the flip-flop circuit being responsive to the lockout signal to inhibit providing the interrupt signals.

7. The system of claim 4, wherein the tachometer circuit further comprises:

an input coupling circuit operatively connected to the probe;

an analog buffering circuit operatively connected to the input coupling circuit; and a high pass filter operatively connected to the analog buffering circuit and to the noise threshold comparator.

8. The system of claim 7, wherein the input coupling circuit includes a capacitor for blocking DC components of the detected signals emitted from the ignition system of the engine and an impedance-matched transformer.

9. A method of detecting a rotational speed of an engine in a vehicle, the method comprising:

connecting a probe to a vehicular ground to detect signals emitted from an ignition system of the engine;

providing a circuit common reference;

identifying the detected signals representing ignition sparks emitted from the ignition system of the engine; and providing an output representative of the rotational speed of the engine based on the identified signals.

10. The method of claim 9, further comprising:

comparing signals detected by the probe to a noise threshold signal;

providing interrupt signals representative of the ignition sparks of the engine in response to the step of comparing signals;

providing a noise threshold command signal based on the ignition sparks of the engine and providing an output signal representing the rotational speed of the engine in response to the interrupt signals; and providing the noise threshold signal in response to the noise threshold command signal.

11. The method of claim 10, wherein the noise threshold signal is provided based on the noise threshold command signal, and the interrupt signals are provided when the signals detected by the probe exceed the noise threshold signal.

12. The method of claim 11, further comprising:

providing a lockout signal of predetermined duration in response to an interrupt signal; and inhibiting provision of the interrupt signals in response to the lockout signal.

13. The method of claim 9, further comprising blocking DC components of the detected signals emitted from the ignition system of the engine.

14. The method of claim 9, further comprising filtering low frequency components of the detected signals emitted from the ignition system of the engine.

* * * * *